US007933363B2

(12) United States Patent
Hammersley

(10) Patent No.: US 7,933,363 B2
(45) Date of Patent: Apr. 26, 2011

(54) POLARIZATION DIVERSITY

(75) Inventor: Tim Gordon Hammersley, Cambridgeshire (GB)

(73) Assignee: Cambridge Silicon Radio Limited, Cambridge (GB)

(*) Notice: Subject to any disclaimer, the term of this patent is extended or adjusted under 35 U.S.C. 154(b) by 579 days.

(21) Appl. No.: 12/105,625

(22) Filed: Apr. 18, 2008

(65) Prior Publication Data

US 2009/0262786 A1 Oct. 22, 2009

(51) Int. Cl.
*H04L 27/06* (2006.01)
(52) U.S. Cl. ............ 375/340; 375/219; 455/67.11; 455/134; 455/226.2
(58) Field of Classification Search .......... 375/260, 375/340, 347, 349, 316, 219, 147; 455/67.11, 455/134, 135, 226.1–226.4; 343/756
See application file for complete search history.

(56) References Cited

U.S. PATENT DOCUMENTS

| 5,689,502 | A | * | 11/1997 | Scott .................... 370/281 |
| 5,748,669 | A | | 5/1998 | Yada |
| 6,366,764 | B1 | * | 4/2002 | Yang et al. ............... 455/73 |
| 6,449,499 | B1 | * | 9/2002 | Ishikura et al. ........ 455/571 |
| 2009/0010311 | A1 | * | 1/2009 | Collier et al. .......... 375/136 |

FOREIGN PATENT DOCUMENTS

| EP | 0454585 A1 | 10/1991 |
| WO | WO 01/41329 A | 6/2001 |
| WO | WO 02/098018 A | 12/2002 |
| WO | WO 2007/034133 A1 | 3/2007 |

OTHER PUBLICATIONS

Pending U.S. Appl. No. 12/088,077, filed Mar. 25, 2008.
International Search Report corresponding to PCT/GB2006/003272, filed Sep. 4, 2006.

* cited by examiner

*Primary Examiner* — Dac V Ha
(74) *Attorney, Agent, or Firm* — Greenberg Traurig, LLP

(57) ABSTRACT

A communication device for receiving a signal in the form of a series of bursts, each burst being in one of a plurality of different available transmission modes, the communication device comprising: a receiver unit coupled to a single antenna operable to receive bursts in first and second polarizations, the receiver unit preferentially receiving signals in a selected polarization; a selection unit for selecting for each received burst in which polarization the receiver unit is to preferentially receive signals; and a signal analysis unit for analyzing each received burst to determine whether it meets a predetermined reception quality criterion; wherein the signal analysis unit is arranged to control the selection unit to: if a burst is to be received with a certain transmission mode and the last burst received with that transmission mode was received above the reception quality criterion, preferentially receive the burst in the same polarization in which the last burst was received; and if a burst is to be received with a certain transmission mode and the last burst received with that transmission mode was received below the reception quality criterion, preferentially receive the burst in a different polarization from that in which the last burst was received.

19 Claims, 1 Drawing Sheet

| Channel | Polarization |
|---------|--------------|
| 1 | 1 |
| 2 | 0 |
| 3 | 1 |
| ... | ... |
| 77 | 0 |
| 78 | 1 |
| 79 | 1 |

POLARIZATION DIVERSITY

FIELD

This disclosure relates to diversity receivers, especially for frequency hopping applications.

BACKGROUND

In frequency hopping communication systems signals are transmitted on a series of different frequencies in successive short bursts. One example is the Bluetooth system, in which signals are transmitted by hopping between 79 channels, with a burst transmitted at each hop.

It is generally desirable to increase the range of operation of communication systems. In a radio system such as Bluetooth, it might theoretically be expected that if transmission power is increased by a factor of 100, range will be increased by a factor of 10. In practice, however, range is typically increased by only a factor of around 0.3. This is due to the fact that in realistic environments there is interference between signals that have taken different paths between the transmitter and the receiver. This interference results in localized regions of cancellation or "fades".

Digital communication systems such as Bluetooth normally incorporate error correction mechanisms that can accommodate some signal degradation. However, when there are too many errors—typically more than 2% for a voice signal carried over Bluetooth—the underlying signal will not be recoverable.

A conventional antenna diversity transceiver has two or more antennas that are spaced apart. The transceiver can use the antennas together or can select a preferred one of the antennas for transmission or reception. This offers advantages because when one antenna is located in a fade, another antenna may still be effective. Antenna diversity has previously been implemented in devices such as DECT base stations.

There are well-known methods for selecting how to combine or choose between diversity antennas in a system that operates at a single constant frequency for transmission or reception, such as a typical TDMA (time division multiple access) system. In such systems it is relatively straightforward to identify which antenna will provide better performance at any time. The system operates for a prolonged period at a single frequency and so the performance of the antennas at that frequency can be monitored and used as the basis for selection between them.

Selecting between antennas in a frequency hopping system is more complex because the locations of fades depend on the frequency at which the system is operating. Because the system transmits only short bursts at each frequency it is not possible to make a prolonged measurement of the performance of each antenna continuously in a way that is directly indicative of its performance at a particular frequency. Unlike in a system in which transmission continues at a particular frequency for a prolonged time, the movement of the antenna into a fade cannot be tracked continuously in a frequency hopping system. For that reason, antenna diversity is not widely used in frequency hopping systems.

However, it is not always practical or economical to provide a receiver with multiple antennas for receiving signal bursts. This is especially true for compact devices which cannot support antennas spaced apart by several wavelengths. Devices having only one antenna cannot benefit from antenna diversity techniques.

There is therefore a need for a method which improves the reception of signal bursts at a single antenna.

BRIEF DESCRIPTION OF THE DRAWINGS

The present disclosure will now be described by way of example with reference to the accompanying drawings.

DETAILED DESCRIPTION

Figures 1, 2:
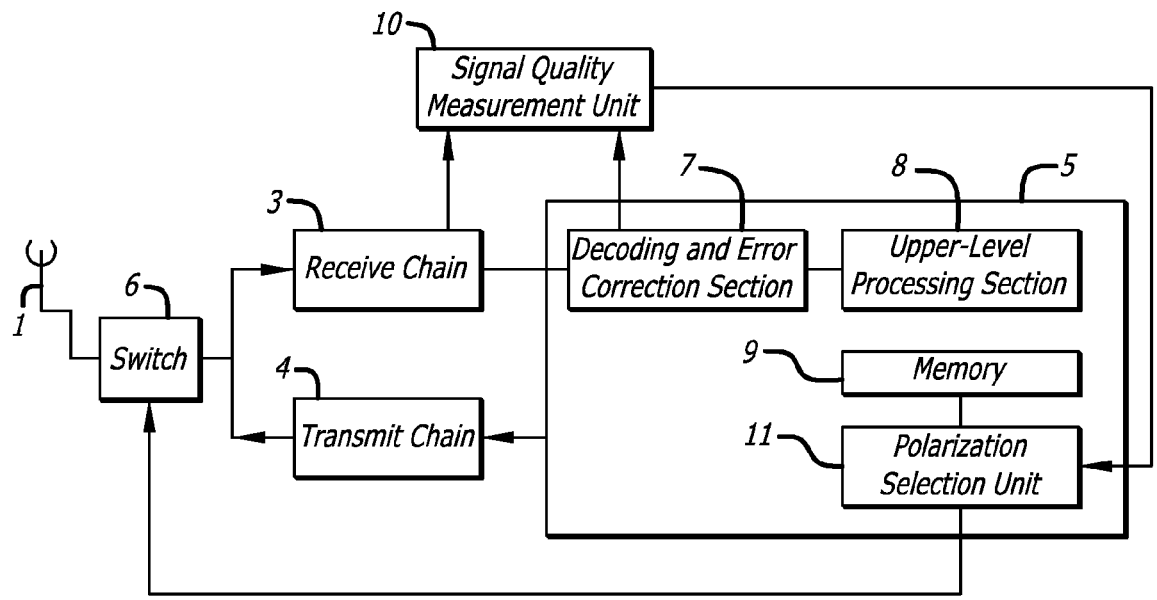
FIG. 1 is a schematic diagram of a system in accordance with the present disclosure.
FIG. 2 shows part of a polarization selection table.

According to a first aspect of the present disclosure, there is provided a communication device for receiving a signal in the form of a series of bursts, each burst being in one of a plurality of different available transmission modes, the communication device comprising: a receiver unit coupled to a single antenna operable to receive bursts in first and second polarizations, the receiver unit preferentially receiving signals in a selected polarization; a selection unit for selecting for each received burst in which polarization the receiver unit is to preferentially receive signals; and a signal analysis unit for analyzing each received burst to determine whether it meets a predetermined reception quality criterion; wherein the signal analysis unit is arranged to control the selection unit to: if a burst is to be received with a certain transmission mode and the last burst received with that transmission mode was received above the reception quality criterion, preferentially receive the burst in the same polarization in which the last burst was received; and if a burst is to be received with a certain transmission mode and the last burst received with that transmission mode was received below the reception quality criterion, preferentially receive the burst in a different polarization from that in which the last burst was received.

Suitably the receiver unit is arranged to receive each burst in only the polarization selected for that burst by the selection unit.

Preferably the receiver unit is arranged to demodulate the signals received in the selected one of the polarizations. Preferably the receiver unit is arranged to decode the signals received in the selected one of the polarizations.

The reception quality criterion could be a criterion of received signal strength or a criterion of error rate.

Preferably the selection unit has access to a data structure identifying for each of the available transmission modes in which of the polarizations the receiver is to preferentially receive signals the next time a burst is received having that transmission mode, and the selection unit is arranged to perform the said selecting in which of the polarizations the receiver is to preferentially receive signals by: if a burst is to be received having a certain transmission mode, accessing the data structure to determine which polarization is identified in the data structure for that transmission mode and controlling the receiver unit to preferentially receive the burst in that polarization.

Preferably the selection unit is responsive to the signal analysis unit to: if a burst is received having a certain transmission mode and does not meet the reception quality criterion, change the polarization identified in the data structure for the transmission mode of that burst.

Preferably the selection unit is responsive to the signal analysis unit to: if a burst is received having a certain transmission mode and does meet the reception quality criterion, leave unchanged the polarization identified in the data structure for the transmission mode of that burst.

Preferably the communication device further comprises a transmitter unit for forming a signal for transmission from the antenna in a selected one of the transmission modes, wherein the selection unit is arranged to select for each transmitted burst in which of the polarizations the transmitter unit is to transmit signals.

Preferably the selection unit is arranged to control the receiver unit to: if a burst is to be transmitted in a certain transmission mode and the last burst received having that transmission mode was received above the reception quality criterion, transmit the burst preferentially in the same polarization in which that last burst was received; and if a burst is to be transmitted in a certain transmission mode and the last burst received having that transmission mode was received below the reception quality criterion, transmit the burst preferentially in a different polarization from that in which that last burst was received.

Suitably the transmission modes differ in that each transmission mode has a different carrier frequency. Suitably the device is a frequency hopping receiver. Suitably the device is a radio receiver. Suitably the device is a Bluetooth receiver.

The antenna may comprise a plurality of elements. Preferably a first set of the elements is operable to preferentially receive a burst in the first polarization and a second set of the elements is operable to preferentially receive a burst in the second polarization. Preferably the first and second sets of elements are selectable by means of one or more electronic switches.

According to a second aspect of the present disclosure, there is provided a method for receiving a signal in the form of a series of bursts, each burst being in one of a plurality of different available transmission modes, by means of a communication device comprising a single antenna operable to receive bursts in first and second polarizations, the method comprising: determining whether each received burst meets a predetermined reception quality criterion; and selecting for each burst in which of the polarizations the receiver unit is to preferentially receive signals, the selection being responsive to the determination such that: if a burst is to be received in a certain transmission mode and the last burst received having that transmission mode was received above the reception quality criterion, preferentially receiving the burst in the same polarization in which that last burst was received; and if a burst is to be received in a certain transmission mode and the last burst received having that transmission mode was received below the reception quality criterion, preferentially receiving the burst in a different polarization from that in which that last burst was received.

The present disclosure relates to a receiver having a single antenna configured to receive signals in a plurality of polarizations. The polarization of the received signals could be, for example, linear or circular, and could be a combination of two or more polarization types. Since the receiver has only one antenna it cannot act as a spatial diversity receiver.

The single antenna preferably comprises a plurality of electrically-switchable elements arranged such that the antenna is operable to receive signals in a plurality of polarizations. For example, the elements of the antenna may be divided into sets, with each set being arranged to preferentially receive a signal burst of a particular polarization and the receiver being configured to switch between the sets in order to switch between the polarizations in which a signal burst is received. This allows a plurality of polarizations to be received without requiring multiple antennas. Furthermore, by arranging for the antenna elements to be electrically switchable such that only certain elements contribute to the signal received by the antenna, it is straightforward to tune each configuration of the antenna. For example, elements could be added or removed from a particular configuration so as to improve the reception of a particular polarization of signal burst. Any such modifications could be provided by means of updated firmware and does not require modification of the antenna hardware itself. Alternatively, the configuration of antenna elements for receiving a particular polarization could be adjusted dynamically in accordance with algorithms configured to optimize the reception of the desired polarization at the antenna.

In particular, the present disclosure relates to a receiver or transceiver arranged to receive signals in a plurality of transmission modes. The transmission modes may be distinguished by frequency (in a frequency hopping system), coding scheme (for example, in CDMA systems) or band (in multi-band systems). The transmission modes could be at least in part distinguished by the polarization of the signals being transmitted, although this need not be the case.

In a first embodiment, a relatively simple algorithm is used to select between polarizations. One polarization is used for reception of each transmission mode. If reception of signals in that polarization is successful, then the same polarization is used the next time reception of that transmission mode is needed. If it is unsuccessful, then a different polarization is used next time.

In more detail, FIG. 1 shows a radio transceiver. The transceiver comprises an antenna 1, a receive chain 3, a transmit chain 4 and a baseband processing unit 5. A switch 6 is located between the antenna and the transmit and receive chains. The switch is controlled by the baseband processing unit 5 and allows signals to be received or transmitted at the antenna in a selected one of the polarizations. As described above, in embodiments of the disclosure in which the antenna comprises a plurality of elements, the switch may be used to switch in and out particular elements of the antenna so as to preferentially receive the signal bursts in each of the polarizations.

The receive chain 3 amplifies and demodulates signals received in a selected one of the polarizations to allow them to be decoded by the baseband processing unit 5. The transmit chain 4 modulates and amplifies signals generated by the baseband processing unit in order that they can be transmitted in a selected one of the polarizations at the antenna. In a frequency hopping system, the receive and transmit chains get input from the baseband processing unit indicating on which of the available frequencies they are to receive or transmit.

The receiver includes a signal quality measurement unit 10, which measures the quality with which each signal is received and compares it to a pre-set threshold. The signal quality measurement unit could be implemented in the receive chain (e.g. if it is to assess a threshold of received signal strength) or in the baseband processing unit (e.g. if it is to assess a threshold of bit error rate). The threshold is a threshold of acceptable reception of signals during a burst. That threshold could, for example, be a threshold level of amplitude, of signal-to-interference ratio, or of error in the decoded signal (for instance a threshold bit error or frame error rate). A combination of the above could be used. A preferred threshold is whether the signals of the burst have been decoded with sufficient confidence that the burst will be passed by a decoding and error correction section 7 of the baseband processing unit for further processing by an upper-level processing section 8, or will the decoding and error correction section indicate to the upper-level processing section that the burst has been lost. One example of a threshold suitable for use in a Bluetooth system is that the received signal strength (RSSI) exceeds −85 dB.

A polarization selection table, an example of which is illustrated in FIG. 2, is stored in a memory 9 of the baseband processing unit. The table indicates which of the polarizations is to be used for the next reception of each transmission mode. In FIG. 2 the table is shown as having two columns: one indicating the channel number (the transmission mode) and one indicating the polarization. In practice, the channel number could be omitted and the polarization inferred from the bit position of the polarization data. FIG. 2 relates to a system configured to receive signals in two polarizations: the polarization indication can therefore be represented and stored as a single bit. This allows the table to be especially compact. The bit is swapped if reception of a burst on a channel is unsuccessful, or falls below a predetermined threshold, and is otherwise not changed. In the case of a system arranged to receive signals in more than two polarizations, the polarization to be used for subsequent reception can be selected in turn, or at random from the polarizations not used last time. The initial selection of polarization when the system is initialized is arbitrary.

Alternatively, the table could list in one column which polarization was last used to receive on each channel and in another column whether that reception was successful, or met the predetermined threshold. From this data the polarization to be used for reception on the next occasion could be determined. However, this would require an extra column in the table.

In operation, the baseband processing unit has knowledge of the transmission mode scheme in use, and its polarization selection unit 11 can determine in which mode the next burst will be received. Immediately before that burst it provides input to the receive chain to configure the receive chain for reception in that mode. It also checks the polarization selection table to identify which of the polarizations is to be used for the next reception in that mode. It then provides input to the switch 6 so as to configure the antenna to receive the burst in the identified polarization. As a result, when the burst is received it is received in the desired polarization indicated by the polarization selection table.

The burst passes to the decoding and error correction section 7, which attempts to decode the burst and apply any appropriate error correction techniques to the decoded data. If the burst has been received with sufficient confidence, it passes it to the upper-level processing section 8. The upper-level processing section could, for example, be an audio processing unit that recovers audio data represented by the received signal and replays it to a user. If the burst has not been received with sufficient confidence, then the decoding and error correction informs the upper-level processing section that the burst has been lost. In the case of non-real-time data, the transceiver could ask the transmitter to retransmit that burst.

If the burst has been received with quality above the predetermined threshold (in this example, with a quality that justifies it being passed to the upper-level processing section 8), then the selection unit 11 of the baseband processing section leaves the data in the polarization selection table unchanged. On the other hand, if the burst has been received with quality below the predetermined threshold, then the data in the polarization selection table for the transmission mode of that burst is changed to indicate another polarization than that which was used for reception of that burst. In the case of a system configured to receive signals in two polarizations it is swapped to indicate a polarization other than that which was used for reception of that burst. In the case of a system configured to receive signals in more than two polarizations it is changed according to a predetermined scheme: for example, by indexing to the next polarization in turn or by changing to another of the polarizations at random. The next burst to be received in the transmission mode of that burst will be received in the polarization newly indicated by the polarization selection table.

As a result, if a burst in a certain transmission mode is received with a quality above the pre-set threshold, then the next burst in that transmission mode will be received in the same polarization. Otherwise, it is received in another polarization.

The present algorithm could be applied to a device that is solely a receiver. Alternatively it could be applied to a device that is a transceiver, and can also transmit signals. The polarization in which signals are transmitted could be held constant, or could be varied by means of some other algorithm. However, in a preferred arrangement the same polarization is used for transmission in a given transmission mode as would be used according to the algorithm described above for reception in that transmission mode. In the embodiment of FIGS. 1 and 2 that would be the polarization indicated for that transmission mode by the table of FIG. 2. By using the approach described above, diversity need be implemented at only one end of the link whilst communication in both directions can be enhanced, and without any signaling overhead over the communication link.

Another approach to deciding in which polarization to receive a particular burst is to measure performance in each polarization at the start of each burst. This could, for example, be done using a preamble of the burst. That measurement could then be used as the basis for the selection of the polarization for the remainder of the burst. The polarization in which the preamble was best received is used to receive the remainder of the burst. The determination of in which polarization the preamble was best received could be made based on a suitable quality criterion, such as received signal strength.

The approaches described above are especially applicable in radio communication systems, most particularly short-range radio communication systems such as Bluetooth. It could be implemented in other systems, especially but not exclusively frequency hopping systems.

Instead of receiving or transmitting exclusively in the selected polarization, it could be used together with one or more other polarizations but with the selected polarization being used with a greater weighting than the others. This may be achieved by the use of filters between the antenna and the receiver/transmitter, rather than a simple switch.

The applicant hereby in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. A communication device for receiving a signal in the form of a series of bursts, each burst being in one of a plurality of different available transmission modes, the communication device comprising:

a receiver unit coupled to a single antenna operable to receive bursts in first and second polarizations, the receiver unit preferentially receiving signals in a selected polarization;

a selection unit for selecting for each received burst in which polarization the receiver unit is to preferentially receive signals; and a signal analysis unit for analyzing each received burst to determine whether it meets a predetermined reception quality criterion; wherein the signal analysis unit is arranged to control the selection unit to:

if a burst is to be received with a certain transmission mode and the last burst received with that transmission mode was received above the reception quality criterion, preferentially receive the burst in the same polarization in which the last burst was received; and if a burst is to be received with a certain transmission mode and the last burst received with that transmission mode was received below the reception quality criterion, preferentially receive the burst in a different polarization from that in which the last burst was received.

2. A communication device as claimed in claim 1, wherein the receiver unit is arranged to receive each burst in only the polarization selected for that burst by the selection unit.

3. A communication device as claimed in claim 1, wherein the receiver unit is arranged to demodulate the signals received in the selected one of the polarizations.

4. A communication device as claimed in claim 1, wherein the receiver unit is arranged to decode the signals received in the selected one of the polarizations.

5. A communication device as claimed in claim 1, wherein the reception quality criterion is a criterion of received signal strength.

6. A communication device as claimed in claim 1, wherein the reception quality criterion is a criterion of error rate.

7. A communication device as claimed in claim 1, wherein the selection unit has access to a data structure identifying for each of the available transmission modes in which of the polarizations the receiver is to preferentially receive signals the next time a burst is received having that transmission mode, and the selection unit is arranged to perform the said selecting in which of the polarizations the receiver is to preferentially receive signals by: if a burst is to be received having a certain transmission mode, accessing the data structure to determine which polarization is identified in the data structure for that transmission mode and controlling the receiver unit to preferentially receive the burst in that polarization.

8. A communication device as claimed in claim 7, wherein the selection unit is responsive to the signal analysis unit to:

if a burst is received having a certain transmission mode and does not meet the reception quality criterion, change the polarization identified in the data structure for the transmission mode of that burst.

9. A communication device as claimed in claim 8, wherein the selection unit is responsive to the signal analysis unit to:

if a burst is received having a certain transmission mode and does meet the reception quality criterion, leave unchanged the polarization identified in the data structure for the transmission mode of that burst.

10. A communication device as claimed in claim 1, comprising a transmitter unit for forming a signal for transmission from the antenna in a selected one of the transmission modes, wherein the selection unit is arranged to select for each transmitted burst in which of the polarizations the transmitter unit is to transmit signals.

11. A communication device as claimed in claim 1, wherein the selection unit is arranged to control the receiver unit to:

if a burst is to be transmitted in a certain transmission mode and the last burst received having that transmission mode was received above the reception quality criterion, transmit the burst preferentially in the same polarization in which that last burst was received; and if a burst is to be transmitted in a certain transmission mode and the last burst received having that transmission mode was received below the reception quality criterion, transmit the burst preferentially in a different polarization from that in which that last burst was received.

12. A communication device as claimed in claim 1, wherein the transmission modes differ in that each transmission mode has a different carrier frequency.

13. A communication device as claimed in claim 1, wherein the device is a frequency hopping receiver.

14. A communication device as claimed in claim 1, wherein the device is a radio receiver.

15. A communication device as claimed in claim 1, wherein the device is a Bluetooth receiver.

16. A communication device as claimed in claim 1, wherein the single antenna comprises a plurality of elements.

17. A communication device as claimed in claim 16, wherein a first set of the elements is operable to preferentially receive a burst in the first polarization and a second set of the elements is operable to preferentially receive a burst in the second polarization.

18. A communication device as claimed in claim 17, wherein the first and second sets of elements are selectable by means of one or more electronic switches.

19. A method for receiving a signal in the form of a series of bursts, each burst being in one of a plurality of different available transmission modes, by means of a communication device comprising a single antenna operable to receive bursts in first and second polarizations, the method comprising:

determining whether each received burst meets a predetermined reception quality criterion; and selecting for each burst in which of the polarizations the receiver unit is to preferentially receive signals, the selection being responsive to the determination such that:

if a burst is to be received in a certain transmission mode and the last burst received having that transmission mode was received above the reception quality criterion, preferentially receiving the burst in the same polarization in which that last burst was received; and if a burst is to be received in a certain transmission mode and the last burst received having that transmission mode was received below the reception quality criterion, preferentially receiving the burst in a different polarization from that in which that last burst was received.

* * * * *